United States Patent
Holmes et al.

(10) Patent No.: US 12,497,510 B2
(45) Date of Patent: Dec. 16, 2025

(54) POLYUREA COMPOSITION WITH A LOW CONTENT IN MONOMERIC DIISOCYANATES

(71) Applicant: SIKA TECHNOLOGY AG, Baar (CH)

(72) Inventors: Jordan Holmes, Huddersfield (GB); Alison Thomson, Preston (GB); Stephen Glover, Chorley (GB); Michelle Round, Leyland (GB); Alexander Coward, Sale (GB); Mark Gatrell, Chipping Preston (GB); Mike Byrne, Lytham (GB)

(73) Assignee: SIKA TECHNOLOGY AG, Baar (CH)

( * ) Notice: Subject to any disclaimer, the term of this patent is extended or adjusted under 35 U.S.C. 154(b) by 486 days.

(21) Appl. No.: 17/921,147

(22) PCT Filed: May 4, 2021

(86) PCT No.: PCT/EP2021/061709
§ 371 (c)(1),
(2) Date: Oct. 25, 2022

(87) PCT Pub. No.: WO2021/233678
PCT Pub. Date: Nov. 25, 2021

(65) Prior Publication Data
US 2023/0183478 A1    Jun. 15, 2023

(30) Foreign Application Priority Data
May 20, 2020   (EP) .................... 20175702

(51) Int. Cl.
*C08G 18/10* (2006.01)
*C08G 18/38* (2006.01)
(Continued)

(52) U.S. Cl.
CPC .............. *C08L 75/02* (2013.01); *C08G 18/10* (2013.01); *C08G 18/3857* (2013.01);
(Continued)

(58) Field of Classification Search
CPC . C08G 18/10; C08G 18/4825; C08G 18/3857
See application file for complete search history.

(56) References Cited

FOREIGN PATENT DOCUMENTS

DE           600 32 938 T2    7/2007
DE    10 2007 025 659 A1    12/2008
(Continued)

OTHER PUBLICATIONS

Jul. 30, 2021 International Search Report issued in International Patent Application No. PCT/EP2021/061709.
(Continued)

*Primary Examiner* — Michael L Leonard
(74) *Attorney, Agent, or Firm* — Oliff PLC

(57) ABSTRACT

A polyurea composition containing monomeric diisocyanates in an amount of max. 0.5 wt. % and consisting of a first component containing a primary, aromatic diamine and a second component containing an isocyante-group-containing polyether urethane polymer containing monomeric diisocyantes in an amount of max. 0.5 wt. % and an aliphatic polyisocyanate with an NCO content of 8 to 25 wt. %.

14 Claims, 1 Drawing Sheet

(51) Int. Cl.
*C08G 18/48* (2006.01)
*C08L 75/02* (2006.01)

(52) U.S. Cl.
CPC ..... *C08G 18/4825* (2013.01); *C08G 2150/00* (2013.01); *C08G 2190/00* (2013.01)

(56) References Cited

FOREIGN PATENT DOCUMENTS

| | | |
|---|---|---|
| DE | 10 2010 028 269 A1 | 10/2011 |
| WO | 2020/030608 A1 | 2/2020 |

OTHER PUBLICATIONS

Nov. 17, 2022 International Preliminary Report on Patentability issued in International Patent Application No. PCT/EP2021/061709.

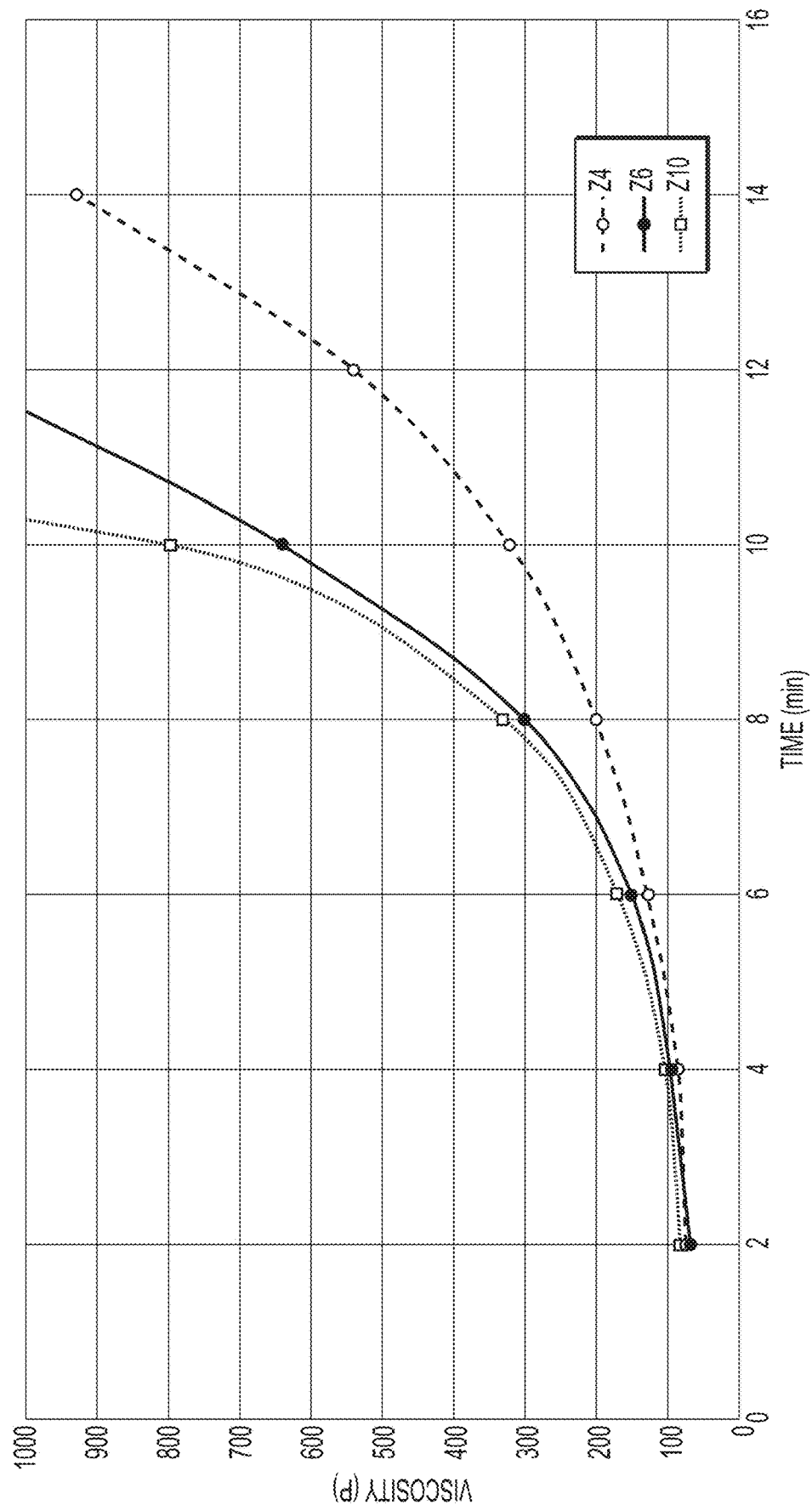

POLYUREA COMPOSITION WITH A LOW CONTENT IN MONOMERIC DIISOCYANATES

TECHNICAL FIELD

The invention relates to polyurea compositions and to the use thereof as coatings.

PRIOR ART

Polyurea compositions that crosslink through reaction of isocyanate groups with amine groups and cure to form elastomers are used especially as coatings in the construction industry, for example as floor coating or as roofing membrane. Owing to their good adhesion and elasticity, they can gently damp and buffer forces acting on the substrates, triggered for instance by vibrations or variations in temperature.

Such polyurea compositions contain conventional polymers containing isocyanate groups as binders, which are prepared by reacting polyols with monomeric diisocyanates. The polymers thus obtained, on account of chain extension reactions, contain a residual monomeric diisocyanate content, typically in the range from 1% to 3% by weight. Monomeric diisocyanates are potentially harmful to health.

Formulations containing monomeric diisocyanates, in particular above a concentration of 0.1% by weight, must be provided with hazard symbols and warning messages on the label and in the data sheets, and in some countries may be subject to regulations in respect of sale and use.

There are various approaches to polymers containing isocyanate groups with a low monomeric diisocyanate content. In terms of product properties, the most attractive route is to use the monomeric diisocyanate in excess in the preparation of the polymer and then to remove the majority of the unconverted monomeric diisocyanate by means of a suitable separation method, especially by means of distillation. Polymers from this process have a comparatively low viscosity and a low residual monomeric diisocyanate content. Polyurea compositions comprising such polymers have very good processability, but show slow curing, reduced strength, and weaknesses in the development of adhesion to the substrates.

DE 60032938 describes the production of castable polyurethane prepolymers that contain lowered or reduced contents or amounts of unconverted MDI monomer.

DE 102010028269 discloses reactive 1K or 2-component adhesives that take the form of pastes at room temperature, are based on polyurethane prepolymers, and have a low content of monomeric isocyanates containing a reactive compound that lowers the viscosity.

DE 102007025659 describes NCO prepolymers having a low content of free monomeric diisocyanate, the preparation thereof and the use of the NCO prepolymers that are prepared in one stage.

SUMMARY OF THE INVENTION

It is therefore an object of the present invention to provide polyurea compositions having a low monomeric diisocyanate content, which overcome the disadvantages of the prior art.

The object is achieved by the polyurea composition as claimed in claim 1. It contains at least one polyetherurethane polymer containing isocyanate groups and having a low monomeric diisocyanate content and at least one aliphatic polyisocyanate. The composition of the invention has a monomeric diisocyanate content of less than 0.5%; it can thus be safely handled even without special safety precautions and can be sold without hazard labeling in many countries.

The composition of the invention surprisingly has a rapid curing rate coupled with long open time/processability, and has high tensile strength and a high modulus of elasticity after curing, which is very advantageous for many applications.

Unexpectedly, the polyurea composition of the invention, together with prolonged open time, additionally has a higher modulus of elasticity and higher elongation at break compared to corresponding compositions having a high monomer content. These advantageous properties cannot be expected from the prior art.

The polyurea composition of the invention has good processability, and has a long open time coupled with rapid curing. This gives rise to an elastic material of high tensile strength coupled with high extensibility and high modulus of elasticity, good bonding properties and high stability to heat and moisture. Moreover, it is thus possible to produce efficiently applicable composition without, or with particularly small amounts of, organic solvents.

The polyurea composition is particularly suitable for use as an elastic coating.

Further aspects of the invention are the subject of further independent claims.

Particularly preferred embodiments of the invention are the subject of the dependent claims.

FIG. 1 is a plot of viscosity over time for three different polyurea compositions.

Ways of Executing the Invention

The invention provides a polyurea composition having a monomeric diisocyanate content of not more than 0.5% by weight, comprising a first component A containing:
at least one primary aromatic diamine A1 selected from the list consisting of diethyltoluenediamine (DETDA), especially 3,5-diethyltoluene-2,4-diamine and 3,5-diethyltoluene-2,6-diamine, 4,4'-methylenebis(2,6-diethyl)aniline (MDEA), 4,4'-methylenebis(2,6-diisopropyl)aniline (MDIPA), 4,4'-methylenebis(3-chloro-2,6-diethyl)aniline (MCDEA) and dimethylthiotoluenediamine (DMTDA), especially 3,5-dimethylthiotoluene-2,6-diamine and 3,5-dimethylthiotoluene-2,4-diamine;

and a second component B containing:
at least one polyetherurethane polymer B1 containing isocyanate groups and having a monomeric diisocyanate content of not more than 0.5% by weight, obtained from the reaction of a monomeric diisocyanate, which is diphenylmethane 4,4'-diisocyanate, optionally with fractions of diphenylmethane 2,4'-diisocyanate and/or 2,2'-diisocyanate, with at least one polyether polyol in an NCO/OH ratio of at least 3/1, and subsequent removal of a majority of the monomeric diisocyanates by means of a suitable separation method, and
at least one aliphatic polyisocyanate B2 having an NCO content of 8% to 25% by weight.

The weight ratio B1/B2 is in the range of 5-50, especially 7.5-30, preferably 8-25.

"Monomeric diisocyanate" refers to an organic compound having two isocyanate groups separated by a divalent hydrocarbyl radical having 4 to 15 carbon atoms. A "polyether urethane polymer" refers to a polymer having ether groups as repeat units and additionally containing urethane groups.

Substance names beginning with "poly", such as polyol, refer to substances containing, in a formal sense, two or more of the functional groups that occur in their name per molecule.

"NCO content" refers to the content of isocyanate groups in % by weight.

"Molecular weight" refers to the molar mass (in grams per mole) of a molecule or a molecule residue. "Average molecular weight" refers to the number-average molecular weight (Mn) of a polydisperse mixture of oligomeric or polymeric molecules or molecule residues. It is determined by gel-permeation chromatography (GPC) against polystyrene as standard, especially with tetrahydrofuran as mobile phase and a refractive index detector.

A substance or composition is referred to as "storage-stable" or "storable" when it can be stored at room temperature in a suitable container over a prolonged period, typically over at least 3 months to up to 6 months and more, without any change in its application or use properties to a degree of relevance for the use thereof as a result of the storage.

"Room temperature" refers to a temperature of 23° C.

All industry standards and norms mentioned in this document relate to the versions valid at the date of first filing.

Percentages by weight (% by weight), abbreviated to wt %, refer to proportions by mass of a constituent of a composition or a molecule, based on the overall composition or the overall molecule, unless stated otherwise. The terms "mass" and "weight" are used synonymously in the present document.

A "primary hydroxyl group" refers to an OH group attached to a carbon atom having two hydrogens.

A "primary amino group" refers to an $NH_2$ group bonded to one organic radical, and a "secondary amino group" refers to an NH group bonded to two organic radicals which may also together be part of a ring.

A composition referred to as a "two-component" composition is one in which the constituents of the composition are present in two different components that are stored in separate containers and are not mixed with one another until shortly before or during the application of the composition.

"Open time" refers to the period of time during which the composition can be applied without losses in the final properties after the components have been mixed.

The two components A and B are stored in separate containers and admixed with one another only shortly before or during the application of the polyurea composition. Such a composition is also referred to as a "two-component" composition.

The polyurea composition has a monomeric diisocyanate content of not more than 0.5% by weight, preferably of not more than 0.3% by weight, of not more than 0.2% by weight, more preferably of not more than 0.1% by weight, most preferably of less than 0.1% by weight.

The first component A contains at least one primary aromatic diamine A1 selected from the list consisting of diethyltoluenediamine (DETDA), especially 3,5-diethyltoluene-2,4-diamine and 3,5-diethyltoluene-2,6-diamine, 4,4'-methylenebis(2,6-diethyl)aniline (MDEA), 4,4'-methylenebis(2,6-diisopropyl)aniline (MDIPA), 4,4'-methylenebis(3-chloro-2,6-diethyl)aniline (MCDEA) and dimethylthiotoluenediamine (DMTDA), especially 3,5-dimethylthiotoluene-2,6-diamine and 3,5-dimethylthiotoluene-2,4-diamine.

More preferably, the primary aromatic diamine A1 is DMTDA, most preferably 3,5-dimethylthiotoluene-2,6-diamine or 3,5-dimethylthiotoluene-2,4-diamine, especially a mixture of these isomers. Such a mixture is commercially available, for example, as Ethacure® 300 (from Albemarle).

The second component B contains at least one polyetherurethane polymer B1 containing isocyanate groups and having a monomeric diisocyanate content of not more than 0.5% by weight, obtained from the reaction of a monomeric diisocyanate, which is diphenylmethane 4,4'-diisocyanate, optionally with fractions of diphenylmethane 2,4'-diisocyanate and/or 2,2'-diisocyanate, with at least one polyether polyol in an NCO/OH ratio of at least 3/1, and subsequent removal of a majority of the monomeric diisocyanates by means of a suitable separation method.

The aforementioned polyetherurethane polymer containing isocyanate groups may also be referred to as polyurethane prepolymer.

The polyetherurethane polymer containing isocyanate groups preferably has a monomeric diisocyanate content of not more than 0.3% by weight, 0.2% by weight, especially not more than 0.1% by weight, most preferably of less than 0.1% by weight.

Preferably, the polyetherurethane polymer containing isocyanate groups has an average molecular weight Mn in the range from 1,000 to 8,000 g/mol, preferably 1,500 to 6,000 g/mol, especially 2,000 to 4,000 g/mol.

The polyetherurethane polymer B1 containing isocyanate groups preferably has an NCO content in the range from 1% to 8.4% by weight, particularly preferably 1.4% to 5.6% by weight, especially 2% to 4.2% by weight.

This is advantageous in that a longer open time/processibility and better mechanical properties, especially in relation to modulus of elasticity and elongation at break, are obtained as a result. This is apparent, for example, in FIG. 1 and in table 2 in the comparison of Z4 with Z10.

Repeat units present in the polyetherurethane polymer containing isocyanate groups are preferably 1,2-ethyleneoxy, 1,2-propyleneoxy, 1,3-propyleneoxy, 1,2-butyleneoxy or 1,4-butyleneoxy groups. Preference is given to 1,2-ethyleneoxy and 1,2-propyleneoxy groups.

More preferably, repeat units present therein are mainly or exclusively 1,2-propyleneoxy groups.

The monomeric diisocyanate used for the reaction is diphenylmethane 4,4'-diisocyanate (4,4'-MDI), optionally with fractions of diphenylmethane 2,4'- and/or 2,2'-diisocyanate.

Particular preference is given to 4,4'-MDI. This 4,4'-MDI is of a quality that contains only small fractions of diphenylmethane 2,4'- and/or 2,2'-diisocyanate and is solid at room temperature. It enables polyurea composition having particularly high strength coupled with high extensibility and elasticity.

The 4,4'-MDI has preferably been distilled and has a purity of at least 95%, especially at least 97.5%.

A commercially available diphenylmethane 4,4'-diisocyanate of this quality is, for example, Desmodur® 44 MC (from Covestro) or Lupranat® MRSS or ME (from BASF) or Suprasec® 1400 (from Huntsman).

The polyether polyol preferably has an average molecular weight Mn in the range from 400 to 5,000 g/mol, preferably 1,000 to 3,000 g/mol.

The polyether polyol preferably has an OH number in the range from 20 to 280 mg KOH/g, preferably in the range from 35 to 120 mg KOH/g, more preferably in the range from 50 to 60 mg KOH/g.

The polyether polyol preferably has an average OH functionality in the range from 1.7 to 3, especially in the range from 1.8 to 2.

Suitable polyether polyols are polyoxyalkylene diols and/or polyoxyalkylene triols, especially polymerization products of ethylene oxide or 1,2-propylene oxide or 1,2- or 2,3-butylene oxide or oxetane or tetrahydrofuran or mixtures thereof, where these may be polymerized with the aid of a starter molecule having two or three active hydrogen atoms, especially a starter molecule such as water, ammonia or a compound having multiple OH or NH groups, such as, for example, ethane-1,2-diol, propane-1,2- or -1,3-diol, neopentyl glycol, diethylene glycol, triethylene glycol, the isomeric dipropylene glycols or tripropylene glycols, the isomeric butanediols, pentanediols, hexanediols, heptanediols, octanediols, nonanediols, decanediols, undecanediols, cyclohexane-1,3- or -1,4-dimethanol, bisphenol A, hydrogenated bisphenol A, 1,1,1-trimethylolethane, 1,1,1-trimethylolpropane, glycerol or aniline, or mixtures of the above-mentioned compounds.

Particular preference is given to polyoxypropylene diols, polyoxypropylene triols, or ethylene oxide-terminated polyoxypropylene diols or triols. These are polyoxyethylene/polyoxypropylene copolyols which are obtained especially by further alkoxylating polyoxypropylene diols or triols with ethylene oxide on conclusion of the polypropoxylation reaction, with the result that they ultimately have primary hydroxyl groups. Polyoxypropylene diols are especially preferred.

Preferred polyether polyols have a degree of unsaturation of less than 0.02 meq/g, especially less than 0.01 meq/g.

Particular preference is given to a polyoxypropylene diol having an OH number in the range from 35 to 120 mg KOH/g, 40 to 80 mg KOH/g, especially in the range from 50 to 60 mg KOH/g.

The NCO/OH ratio in the reaction between the monomeric diisocyanate with the polyether polyol is preferably in the range from 3/1 to 10/1, more preferably in the range from 3/1 to 8/1, especially in the range from 4/1 to 7/1.

The reaction is preferably carried out with exclusion of moisture at a temperature within a range from 20 to 160° C., especially 40 to 140° C., optionally in the presence of suitable catalysts.

After the reaction, the monomeric diisocyanate remaining in the reaction mixture is removed by means of a suitable separation method down to the residual content described.

A preferred separation method is a distillative method, especially thin-film distillation or short-path distillation, preferably with application of reduced pressure.

Particular preference is given to a multistage method in which the monomeric diisocyanate is removed in a short-path evaporator with a jacket temperature in the range from 160 to 200° C. and a pressure of 0.001 to 0.5 mbar.

Preference is given to reacting the monomeric diisocyanate with the polyether polyol and subsequently removing the majority of the monomeric diisocyanate remaining in the reaction mixture without the use of solvents or entraining agents.

In the reaction, the OH groups of the polyether polyol react with the isocyanate groups of the monomeric diisocyanate. This results also in what are called chain extension reactions, in that there is reaction of OH groups and/or isocyanate groups of products of the reaction between polyol and monomeric diisocyanate. The higher the NCO/OH ratio chosen, the lower the level of chain extension reactions that takes place, and the lower the polydispersity and hence the viscosity of the polymer obtained. A measure of the chain extension reaction is the average molecular weight of the polymer, or the breadth and distribution of the peaks in the GPC analysis. A further measure is the effective NCO content of the polymer freed of monomers relative to the theoretical NCO content calculated from the reaction of every OH group with a monomeric diisocyanate.

The NCO content in the polyetherurethane polymer is preferably at least 80%, especially at least 85%, of the theoretical NCO content which is calculated from the addition of one mole of monomeric diisocyanate per mole of OH groups of the polyether polyol. Such a polyetherurethane polymer is of particularly low viscosity.

A particularly preferred polyetherurethane polymer has an NCO content in the range from 1% to 8.4% by weight, more preferably 1.4% to 5.6% by weight, especially 2% to 4.2% by weight, and a monomeric diisocyanate content of not more than 0.3% by weight, especially not more than 0.2% by weight, and is obtained from the reaction of 4,4'-MDI with a polyoxypropylene diol having an OH number in the range from 35 to 120 mg KOH/g, 40 to 80 mg KOH/g, especially in the range from 50 to 60 mg KOH/g.

The second component B contains at least one aliphatic polyisocyanate B2 having an NCO content of 8% to 25% by weight, preferably of 10% to 22.5% by weight, especially of 10% to 21% by weight, more preferably of 15% to 21% by weight.

An "aliphatic isocyanate" refers to an isocyanate wherein the isocyanate groups are bonded directly to an aliphatic carbon atom. Accordingly, isocyanate groups of this kind are referred to as "aliphatic isocyanate groups".

Preferably, the aliphatic polyisocyanate B2 is an oligomer, polymer and/or derivative derived from hexamethylene 1,6-diisocyanate (HDI) or isophorone diisocyanate (IPDI), especially HDI.

The aliphatic polyisocyanate B2 preferably has an average NCO functionality of at least 2.1. They especially preferably have an average NCO functionality of 2.1 to 4.0, preferably 2.1 to 3.0, especially 2.1 to 2.6.

This is conducive particularly to higher elongation at break. This is apparent, for example, in table 1 in the comparison of Z3-Z6 with Z7-Z8.

Moreover, it may also be advantageous when the aliphatic polyisocyanate B2 has an average NCO functionality of 2.2 to 3.0, especially 2.3 to 2.8, more preferably 2.4 to 2.6.

This is conducive particularly to higher tensile strength. This is apparent, for example, in table 1 in the comparison of Z5-Z6 with Z3-Z4 and Z7-Z8.

Moreover, it may be advantageous when the aliphatic polyisocyanate B2 has an average NCO functionality of 2.2 to 4.0, especially 2.4 to 3.8, more preferably 2.8 to 3.6.

This is conducive particularly to higher modulus of elasticity. This is apparent, for example, in table 1 in the comparison of Z7-Z8 with Z5-Z6 and Z3-Z4.

The aliphatic polyisocyanate B2 particularly advantageously comprises oligomers, polymers and/or derivatives derived from HDI, especially polymers derived from HDI, especially having an average NCO functionality of 2.1 to 2.6.

They preferably have a viscosity at 23° C. of 300-2000 mPa·s, preferably 400-1500 mPa·s, especially 500-1350 mPa·s, to DIN EN ISO 3219/A.3.

Among these, commercially available products are especially suitable, for example Desmodur® 2863 XP, Desmodur® 2860 XP and Desmodur® N 3900 (all from Covestro).

It is further advantageous when the aliphatic polyisocyanate B2 has a monomeric diisocyanate content of not more than 0.75% by weight, not more than 0.5% by weight, not more than 0.4% by weight, especially not more than 0.3% by weight.

The weight ratio B1/B2 is in the range of 5-50, especially 7.5-30, preferably 8-25. This is advantageous in that a longer open time/processibility, a higher curing rate and better mechanical properties, especially in relation to modulus of elasticity and tensile strength, are obtained as a result. This is apparent, for example, in table 1 in the comparison of Z3-Z8 with Z1. Compositions based on P1 alone (Z1) do have prolonged processibility, but have a low curing rate and also have inadequate mechanical properties, especially in relation to modulus of elasticity and tensile strength.

It may be advantageous when the weight ratio B1/B2 is in the range of 7-30, 7-15, especially 7-12, preferably 8-10. This is advantageous in that higher curing rates and higher moduli of elasticity are obtained as a result.

It may further be advantageous when the weight ratio B1/B2 is in the range of 7-30, 10-30, especially 15-25, preferably 17-22. This is advantageous in that longer opening times and higher elongations at break are obtained as a result.

It may further be advantageous when the sum total of the NCO groups that do not originate from B1 or B2 is ≤10%, ≤5%, especially ≤2%, especially preferably ≤1%, most preferably ≤0.5%, based on the sum total of all NCO groups of the polyurea composition.

The polyurea composition may contain further constituents.

The first component A may contain further compounds suitable as hardener, especially further amines, amino alcohols, chain extenders such as butane-1,4-diol or polyols, and amines having blocked amino groups such as aldimines, ketimines or enamines.

Preferably, component A contains only a small content of such further hardeners. In particular, the content of groups reactive toward NCO groups that do not come from a primary aromatic diamine A1 is less than 50 mol %, preferably less than 20 mol %, especially less than 10 mol %, based on all groups reactive toward NCO groups in component A.

The second component B may contain further constituents containing isocyanate groups, especially further polymers or polyisocyanates. Preferably, component B contains only a small content of further constituents containing isocyanate groups. In particular, the content of NCO groups that do not come from a polyetherurethane polymer B1 or aliphatic polyisocyanate B2 is less than 25%, preferably less than 10%, especially less than 5%, based on all NCO groups in component B.

It may further be advantageous when the sum total of the NCO groups that do not originate from B1 or B2 is ≤10%, ≤5%, especially ≤2%, especially preferably ≤1%, most preferably ≤0.5%, based on the sum total of all NCO groups of the polyurea composition.

Preferably, the polyurea composition additionally contains at least one further constituent selected from the list consisting of fillers, inorganic or organic pigments, flame-retardant substances and additives.

The proportion of fillers is preferably 5-30% by weight, especially 10-25% by weight, more preferably 10-20% by weight, based on the total weight of the polyurea composition.

The proportion of inorganic or organic pigments, flame-retardant substances and additives is preferably 2-10% by weight, especially 3-8% by weight, more preferably 3-5% by weight, based on the total weight of the polyurea composition.

Preferably, the inorganic or organic pigments are titanium dioxide, chromium oxides or iron oxides.

Flame-retardant substances are preferably selected from the list consisting of aluminum hydroxide, magnesium hydroxide, organic phosphoric esters, such as in particular triethyl phosphate, tricresyl phosphate, triphenyl phosphate, diphenyl cresyl phosphate, isodecyl diphenyl phosphate, tris(1,3-dichloro-2-propyl) phosphate, tris(2-chloroethyl) phosphate, tris(2-ethylhexyl) phosphate, tris(chloroisopropyl) phosphate, tris(chloropropyl) phosphate, isopropylated triphenyl phosphate, mono-, bis- or tris(isopropylphenyl) phosphates having varying degrees of isopropylation, resorcinol bis(diphenylphosphate), bisphenol A bis(diphenylphosphate) and ammonium polyphosphates.

The additives are especially additives selected from the list consisting of wetting agents, levelling agents, defoamers, deaerating agents, stabilizers against oxidation, heat, light or UV radiation, and biocides.

Suitable fillers are especially selected from the list consisting of ground or precipitated calcium carbonates, optionally coated with fatty acids, especially stearates, barytes, quartz flours, quartz sands, dolomites, wollastonites, calcined kaolins, sheet silicates, such as mica or talc, zeolites, silicas, including finely divided silicas from pyrolysis processes, cements, gypsums, fly ashes, industrially produced carbon blacks, graphite, metal powders, for example of aluminum, copper, iron, silver or steel, PVC powders or hollow beads.

Preference is given to calcium carbonates that have optionally been coated with fatty acids, especially stearates, and calcined kaolins.

In the production of the polyurea composition of the invention, the monomeric diisocyanate content is optionally further reduced by reaction with moisture present on mixing of the polyetherurethane polymer containing isocyanate groups with further constituents of the composition, especially fillers.

The polyurea composition preferably contains
3% to 15% by weight, 5% to 12% by weight, especially 7% to 10% by weight, of primary aromatic diamine A1 selected from the list consisting of diethyltoluenediamine, especially 3,5-diethyltoluene-2,4-diamine and 3,5-diethyltoluene-2,6-diamine, 4,4'-methylenebis(2,6-diethyl)aniline (MDEA), 4,4'-methylenebis(2,6-diisopropyl)aniline (MDIPA), 4,4'-methylenebis(3-chloro-2,6-diethyl)aniline (MCDEA) and dimethylthiotoluenediamine (DMTDA), especially 3,5-dimethylthiotoluene-2,6-diamine and 3,5-dimethylthiotoluene-2,4-diamine,
55% to 90% by weight, 60% to 90% by weight, 70% to 85% by weight, especially 75% to 85% by weight, of polyetherurethane polymer B1 containing isocyanate groups and having a low monomeric diisocyanate content of not more than 0.5% by weight,
2% to 15% by weight, 3% to 10% by weight, especially 4% to 8% by weight, of aliphatic polyisocyanate B2 having an NCO content of 8% to 25% by weight,
5-30% by weight, especially 10-25% by weight, more preferably 10-20% by weight, of fillers,
2-10% by weight, especially 3-8% by weight, more preferably 3-5% by weight, of inorganic or organic pigments, flame-retardant substances and additives.

The polyurea composition preferably consists to an extent of more than 80% by weight, more than 90% by weight, more than 95% by weight, more than 98% by weight, especially more than 99% by weight, of the constituents listed in the aforementioned polyurea composition.

In order to produce such products in efficiently applicable form, it would be possible, for example, to add a considerable proportion of volatile organic solvents in order to lower viscosity and hence ensure good applicability. However, this is disadvantageous for reasons of protection of the environment and health, since the compositions have high VOC emissions as a result.

Preferably, the polyurea composition contains less than 5% by weight, less than 2% by weight, less than 1% by weight, less than 0.5% by weight, especially less than 0.1% by weight, of solvent, based on the total weight of the polyurea composition. Such solvents are especially acetone, methyl ethyl ketone, methyl n-propyl ketone, diisobutyl ketone, methyl isobutyl ketone, methyl n-amyl ketone, methyl isoamyl ketone, acetylacetone, mesityl oxide, cyclohexanone, methylcyclohexanone, ethyl acetate, propyl acetate, butyl acetate, n-butyl propionate, diethyl malonate, 1-methoxy-2-propyl acetate, ethyl 3-ethoxypropionate, diisopropyl ether, diethyl ether, dibutyl ether, diethylene glycol diethyl ether, ethylene glycol diethyl ether, ethylene glycol monopropyl ether, ethylene glycol mono(2-ethylhexyl) ether, acetals such as, in particular, methylal, ethylal, propylal, butylal, 2-ethylhexylal, dioxolane, glycerol formal or 2,5,7,10-tetraoxaundecane (TOU), and toluene, xylene, heptane, octane, naphtha, white spirit, petroleum ether or petroleum spirit, and additionally methylene chloride, propylene carbonate, butyrolactone, N-methylpyrrolidone or N-ethylpyrrolidone. This is advantageous for reasons of protection of the environment and health, since the compositions have low VOC emissions as a result. It has been found that, surprisingly, the present invention achieves a low viscosity without the solvents described above.

In the polyurea composition, the ratio of the isocyanate groups relative to the groups reactive toward isocyanate groups, especially amino groups, is preferably in the range from 1 to 1.2, preferably in the range from 1 to 1.1.

Preferably, the composition has a viscosity 120 seconds after the two components have been mixed, especially at 100 revolutions/minute, measured with a Brookfield HBDV-II+ viscometer using spindle 7 at 23° C. and 50% relative air humidity, of 1,000-20,000 cPs, preferably 2,000-15,000 cPs, especially 3,000-12,000 cPs.

The first and second components of the composition are produced separately from one another. The constituents of the respective component are mixed here with one another with exclusion of moisture, so as to give a macroscopically homogeneous liquid. Each component is stored in a separate moisture-tight container. A suitable container is in particular a drum, a bulk container, a hobbock, a pail, a can, a pouch, a canister or a bottle.

For the use of the composition, the two components are mixed with one another shortly before or during the application. The mixing ratio is preferably chosen such that the groups reactive toward isocyanates are present in a suitable ratio to the isocyanate groups, as described above. Component typically in the range from about 1:1 to 1:20, especially 1:2 to 1:10.

The two components are mixed by means of a suitable stirring mechanism, such as a double-shaft mixer, for example, with the individual components suitably having been premixed in the correct mixing ratio. Likewise possible is continuous machine processing by means of a two-component metering unit with static or dynamic mixing of the components. In the mixing, it should be ensured that the two components are mixed with maximum homogeneity. If mixing precedes application, care must be taken to ensure that the time elapsing between mixing of the components and the application of the mixture is not too great, since if it is there may be disruptions, such as poor flow or retarded or incomplete development of the adhesion to the substrate, for example. Mixing takes place in particular at ambient temperature, which is typically in the range from about 5 to 50° C., preferably about 10 to 35° C.

Curing by chemical reaction begins with the mixing of the two components. NCO-reactive groups available, especially amino groups, react here with isocyanate groups available. As a result of these reactions, the composition cures to give a solid material. This process is also referred to as crosslinking.

The invention further relates to a cured composition obtained from a composition as described above, after the two components have been mixed and cured.

In the application, the freshly mixed, still-liquid composition can be applied as a coating to a surface. Preference is given to applying the composition by pouring it onto a substrate and then distributing it over the area until the layer thickness is as desired, for example by means of a roller, a slider, a notched trowel, a palette knife, a brush or a paintbrush.

The invention further provides a method of coating or sealing, comprising the steps of
 (i) mixing the components of the polyurea composition,
 (ii) applying the mixed polyurea composition to at least one substrate,
 (iii) curing the composition.

The polyurea composition is preferably mixed and applied at ambient temperature, especially in the range from about -10 to 50° C., preferably in the range from -5 to 45° C., especially 0 to 40° C.

The polyurea composition is preferably likewise cured at ambient temperature.

The polyurea composition has a long processing time (open time) and rapid curing.

The polyurea composition after curing preferably has a tensile strength of at least 5 MPa, at least 8 MPa, especially at least 10 MPa, determined as described in the examples.

The polyurea composition after curing also preferably has an elongation at break of at least 300%, at least 500%, especially at least 700%, determined as described in the examples.

The polyurea composition after curing also preferably has a modulus of elasticity of at least 8 MPa, especially in the range from 9 to 40 MPa, preferably 10 to 20 MPa, determined as described in the examples.

The polyurea composition is preferably used as elastic coating.

The polyurea composition is especially suitable as coating for protection and/or for sealing of built structures or parts thereof, especially for balconies, terraces, roofs, especially flat roofs or slightly inclined roof areas or roof gardens, or in building interiors beneath tiles or ceramic plates in wet rooms or kitchens.

As coating, it can be distributed, for example, over an area until the layer thickness is as desired, for example by means of a roller, a slider, a notched trowel or a palette knife. The resultant layer thickness is typically in the range from 0.5 to 3 mm, especially 1.0 to 2.5 mm.

Suitable substrates that can be coated with the polyurea composition are especially concrete, mortar, cement screed, fiber cement, especially fiber cement boards, brick, tile, gypsum, especially gypsum boards or anhydride screed, or natural stone, such as granite or marble;

repair compounds or leveling compounds based on PCC (polymer-modified cement mortar) or ECC (epoxy resin-modified cement mortar);

metals or alloys, such as aluminum, copper, iron, steel, nonferrous metals, including surface-finished metals or alloys, such as zinc-plated or chromium-plated metals; asphalt or bitumen;

If required, the substrates can be pretreated prior to application, especially by physical and/or chemical cleaning methods or the application of an activator or a primer.

The application and curing of the polyurea composition, or the method of coating or sealing, affords an article sealed or coated with the composition. This article may be a built structure or part thereof, especially a built structure above or below ground, a balcony or a staircase.

The invention thus further provides an article obtained from the described method of coating or sealing.

The polyurea composition has advantageous properties. On account of its low monomeric diisocyanate content, it can be safely handled even without special safety precautions and does not require any hazard labeling in relation to the monomeric diisocyanates, has very good applicability and has a long processing time (open time) coupled with surprisingly rapid curing. This gives rise to an elastic material of surprisingly high tensile strength coupled with high extensibility, good bonding properties and high stability to heat and moisture.

EXAMPLES

Working examples are adduced hereinafter, which are intended to further elucidate the invention described. The invention is of course not limited to these described working examples.

Unless stated otherwise, the chemicals used were from Sigma-Aldrich.

Preparation of Polymers Containing Isocyanate Groups:

Viscosity was measured using a thermostated Rheotec RC30 cone-plate viscometer (cone diameter 50 mm, cone angle 1°, cone tip-plate distance 0.05 mm, shear rate 10 s$^{-1}$).

Monomeric diisocyanate content was determined by means of HPLC (detection via photodiode array; 0.04 M sodium acetate/acetonitrile as mobile phase) after prior derivation by means of N-propyl-4-nitrobenzylamine.

Polymer P1:

613.0 g of polyoxypropylene diol (OH number 56 mg KOH/g, Voranol® 2000 L, from Dow) and 387.0 g of diphenylmethane 4,4'-diisocyanate (Desmodur® 44 MC L, from Covestro) were converted by a known method at 80° C. to a polymer having an NCO content of 10.5% by weight, a viscosity of 4 Pa·s at 20° C. and a monomeric diphenylmethane 4,4'-diisocyanate content of about 24% by weight.

Subsequently, the volatile constituents, especially a majority of the monomeric diphenylmethane 4,4'-diisocyanate, were removed by distillation in a short-path evaporator (jacket temperature 180° C., pressure 0.1 to 0.005 mbar, condensation temperature 47° C.). The polymer thus obtained had an NCO content of 3.0% by weight, a viscosity of 21 Pa·s at 20° C., and a monomeric diphenylmethane 4,4'-diisocyanate content of 0.05% by weight.

Polymer P2:

500.0 g of polyoxypropylene diol (OH number 56 mg KOH/g, Voranol® 2000 L, from Dow) and 131.0 g of diphenylmethane 4,4'-diisocyanate (Desmodur® 44 MC L, from Covestro) were converted by a known method at 80° C. to a polymer having an NCO content of 3.5% by weight and a monomeric diphenylmethane 4,4'-diisocyanate content of about 2% by weight.

Polyurea Compositions:

Compositions Z1 to Z10:

For each composition, the ingredients specified in tables 1 and 2 were mixed in the amounts specified (in percent by weight) by means of a centrifugal mixer (SpeedMixer™ DAC 150.1VZ, FlackTek Inc.) with exclusion of moisture at 2500 rpm for 30 seconds and stored with exclusion of moisture. Each composition was tested as follows:

---

Polyisocyanates used:

Desmodur E 2863 XP, mixture of HDI prepolymer with HDI homopolymer, average NCO functionality of 2.2, NCO content of 11% by weight, monomer content of <0.3%, viscosity at 23° C. about 1.350 mPa·s.

Desmodur 2860 XP, HDI allophanate, average NCO functionality of 2.5, NCO content of 20% by weight, monomer content of <0.16%, viscosity at 23° C. about 500 mPa·s.

Desmodur N 3900, HDI homopolymer, average NCO functionality of 3.5, NCO content of 23.5% by weight, monomer content of <0.25%, viscosity at 23° C.: 730 ± 100 mPa·s.

---

The viscosity of the compositions was measured using a Brookfield HBDV-II+ viscometer using spindle 7 and a speed of 100 rpm at 23° C. and 50% relative air humidity.

Viscosity was measured periodically at intervals of 2 minutes in order to determine the gel point and increase in viscosity with time. The initial viscosity was measured 2 minutes after commencement of the mixing in the Speedmixer. The results are shown in tables 1 and 2 as "Initial viscosity" measured after 2 min, and plotted against time in FIG. 1.

A measure determined for the processing time (open time) was the time at which self-leveling properties were lost ("VSE"). For this purpose, the loss of self-leveling properties was determined via the assessment of the surface of the coating for the presence of crater marks and/or brush marks. Each composition was applied in a thickness of 2 millimeters at intervals of 1 minute and, after 2 hours, a visual assessment of the surface of the coating was made.

A measure determined for the curing rate was "Readiness for foot traffic" in hours at 23° C. and 50% relative air humidity. For this purpose, each composition was applied to an aluminum substrate in a thickness of 2 millimeters. A load of 100 kg was applied to the coating over an area of 10 cm$^2$ for 5 seconds, and this was repeated at regular time intervals of 1 hour. "Readiness for foot traffic" was determined as the juncture at which no fracture or penetration of the load applied into the surface of the coating occurred.

Mechanical properties were determined using a Lloyds Instruments LR5k tensometer. The following were determined for table 1:

1) Tensile strength "ZF" (N/mm$^2$),
2) Elongation at break "BD" (%),
3) Modulus of elasticity "E-mod" (N/mm$^2$)

In table 2, the mechanical properties were tested after thermal aging "4w 80° C.", and hydrolysis stability "4w 70/W", and compared with the untreated samples that had been stored at 23° C. and 50% relative air humidity for 2 days, "2d NK":

Stability to Thermal Aging at 80° C. ("4w 80° C.");

A film of each composition was stored in an incubator at 80° C. for a period of 4 weeks.

On removal from the incubator, each film was conditioned at 23° C./50% relative air humidity for 24 hours before the determination of the mechanical properties was conducted.

Hydrolysis Stability at 70° C. ("4w 70/W"):

A film of each composition was immersed in water and stored in water in an incubator at 70° C. for a period of 4 weeks.

On removal from the incubator, the films were then stored at an elevated temperature of 60° C. for 24 hours in order to remove the moisture.

This was followed by conditioning at 23° C./50% relative air humidity for a further 24 hours before the determination of the mechanical properties was conducted.

The results are reported in Tables 1 and 2.

Compositions Z3-Z8 are inventive examples. Compositions Z1, Z2, Z9 and Z10 are comparative examples and are given the addition "(Ref.)".

It is apparent from table 1 that the processability of compositions according to the prior art (Z2) is too low, and they have inadequate mechanical properties, especially modulus of elasticity and tensile strength.

Compositions based on P1 alone (Z1) do have prolonged processability, but have a low curing rate and also have inadequate mechanical properties, especially modulus of elasticity and tensile strength.

Moreover, it is apparent in table 2 that the addition of HDI in the case of prepolymer P2 versus P1 leads to a lower modulus of elasticity and to a lower elongation at break in the case of 2d NK, and of 4w 70/W. FIG. 1 also shows a significantly shortened open time (rise in viscosity) compared to Z4.

TABLE 1

(in percent by weight) of Z1 to Z9.

|  | Z1 (ref.) | Z2 (ref.) | Z3 | Z4 | Z5 | Z6 | Z7 | Z8 | Z9 (ref.) |
|---|---|---|---|---|---|---|---|---|---|
| P1 | 88.9 |  | 83.9 | 79.4 | 83.1 | 78.0 | 82.7 | 77.4 | 80.8 |
| P2 |  | 87.7 |  |  |  |  |  |  |  |
| HDI 1[1] |  |  | 4.2 | 7.9 |  |  |  |  |  |
| HDI 2[2] |  |  |  |  | 4.1 | 7.8 |  |  |  |
| HDI 3[3] |  |  |  |  |  |  | 4.1 | 7.7 |  |
| MDI[4] |  |  |  |  |  |  |  |  | 4.1 |
| Amine[5] | 6.2 | 7.4 | 7.0 | 7.8 | 7.9 | 9.3 | 8.3 | 10.0 | 10.2 |
| Additives[6] | 4.9 | 4.9 | 4.9 | 4.9 | 4.9 | 4.9 | 4.9 | 4.9 | 4.9 |
| Total | 100 | 100 | 100 | 100 | 100 | 100 | 100 | 100 | 100 |
| NCO/NH | 105:100 | 105:100 | 105:100 | 105:100 | 105:100 | 105:100 | 105:100 | 105:100 | 105:100 |
| Initial viscosity after 2 min (cPs) | 10.480 | 23.600 | 11.360 | 10.360 | 9.720 | 11.240 | 11.040 | 10.600 | 24.000 |
| VSE (min) | 17 | 8 | 14 | 13 | 13 | 11 | 11 | 9 | 6 |
| Readiness for foot traffic (h) | 3 | <2 | 2 | <2 | 2 | <2 | 2 | <2 | <2 |
| E-mod (N/mm$^2$) | 5 | 6 | 9 | 12 | 13 | 25 | 16 | 37 | 13 |
| ZF (N/mm$^2$) | 2 | 4 | 8 | 9 | 12 | 14 | 11 | 10 | 12 |
| BD (%) | 1084 | 514 | 1083 | 825 | 761 | 566 | 506 | 310 | 751 |

[1]Desmodur 2863 XP, NCO functionality 2.2 (from Covestro)
[2]Desmodur 2860 XP, NCO functionality 2.5 (from Covestro)
[3]Desmodur N3900, NCO functionality 3.5 (from Covestro)
[4]MDI monomer, Desmodur V50L (from Covestro)
[5]Ethacure 300, DMTDA (from Albemarle)
[6]Additives: defoamer, dispersant and pigment

TABLE 2

(in percent by weight) of Z10, Z4 and Z6.

|  |  | Z10 (ref.) | Z4 | Z6 |
|---|---|---|---|---|
| P1 |  |  | 79.4 | 78.0 |
| P2 |  | 78.6 |  |  |
| HDI 1[1] |  |  | 7.9 |  |
| HDI 2[2] |  |  |  | 7.7 |
| Amine[5] |  | 8.9 | 7.8 | 9.4 |
| Additives[6] |  | 4.6 | 4.9 | 4.9 |
| Total |  | 100.00 | 100.00 | 100.00 |
| NCO/NH |  | 105:100 | 105:100 | 105:100 |
| Initial viscosity after 2 min (cPs) |  | 22.800 | 10.360 | 9.720 |
| 2 d SCC | ZF (N/mm$^2$) | 2.26 | 2.12 | 3.4 |
| 2 d SCC | BD (%) | 298 | 448 | 810 |
| 2 d SCC | E-mod (N/mm$^2$) | 5.2 | 5.5 | 9.8 |
| 4 w 80° C. | ZF (N/mm$^2$) | 6.71 | 6.71 | 10.25 |
| 4 w 80° C. | BD (%) | 407 | 407 | 445 |
| 4 w 70/W | ZF (N/mm$^2$) | 7.24 | 6.95 | 7.34 |
| 4 w 70/W | BD (%) | 808 | 1232 | 585 |

[1]Desmodur 2863 XP, NCO functionality 2.2 (from Covestro)
[2]Desmodur 2860 XP, NCO functionality 2.5 (from Covestro)
[5]Ethacure 300, DMTDA (from Albemarle)
[6]Additives: defoamer, dispersant and pigment

The invention claimed is:

1. A polyurea composition having a monomeric diisocyanate content of not more than 0.5% by weight, comprising a first component A containing:
at least one primary aromatic diamine A1 selected from the list consisting of diethyltoluenediamine, 4,4'-methylenebis(2,6-diethyl)aniline, 4,4'-methylenebis(2,6-diisopropyl)aniline, 4,4'-methylenebis(3-chloro-2,6-diethyl)aniline and dimethylthiotoluenediamine;

a second component B containing:
at least one polyetherurethane polymer B1 containing isocyanate groups and having a monomeric diisocyanate content of not more than 0.5% by weight, obtained from the reaction of a monomeric diisocyanate, which is diphenylmethane 4,4'-diisocyanate, with at least one polyether polyol in an NCO/OH ratio of at least 3/1, and subsequent removal of a majority of the monomeric diisocyanates by means of a suitable separation method, and at least one aliphatic polyisocyanate B2 having an NCO content of 8% to 25% by weight;

where the weight ratio B1/B2 is in the range of 8-30.

2. The polyurea composition as claimed in claim 1, wherein the polyetherurethane polymer B1 containing isocyanate groups has an NCO content in the range from 1% to 8.4% by weight.

3. The polyurea composition as claimed in claim 1, wherein the polyether polyol has an OH number in the range from 20 to 280 mg KOH/g.

4. The polyurea composition as claimed in claim 1, wherein the polyether polyol has an average OH functionality in the range from 1.7 to 3.

5. The polyurea composition as claimed in claim 1, wherein the NCO/OH ratio in the reaction between the monomeric diisocyanate and the polyether polyol is in the range from 3/1 to 10/1.

6. The polyurea composition as claimed in claim 1, wherein the at least one primary aromatic diamine A1 is dimethylthiotoluenediamine.

7. The polyurea composition as claimed in claim 1, wherein the aliphatic polyisocyanate B2 is an oligomer, polymer and/or derivative derived from hexamethylene 1,6-diisocyanate or isophorone diisocyanate.

8. The polyurea composition as claimed in claim 1, wherein the aliphatic polyisocyanate B2 has an average NCO functionality of at least 2.1.

9. The polyurea composition as claimed in claim 1, wherein it contains less than 5% by weight, less than 2% by weight, less than 1% by weight, less than 0.5% by weight of solvent, based on the total weight of the polyurea composition.

10. The polyurea composition as claimed in claim 1, wherein the ratio of the isocyanate groups relative to the groups reactive toward isocyanate groups is in the range from 1 to 1.2.

11. The polyurea composition as claimed in claim 1, containing:

3% to 15% by weight of the primary aromatic diamine A1, selected from the group consisting of diethyltoluenediamine, 4,4'-methylenebis(2,6-diethyl)aniline, 4,4'-methylenebis(2,6-diisopropyl)aniline, 4,4'-methylenebis(3-chloro-2,6-diethyl)aniline and dimethylthiotoluenediamine, 55% to 90% by weight of the polyetherurethane polymer B1 containing isocyanate groups and having a monomeric diisocyanate content of not more than 0.5% by weight, 2% to 15% by weight of the aliphatic polyisocyanate B2 having an NCO content of 8% to 25% by weight, 5-30% by weight of fillers, and 2-10% by weight total of one or more of inorganic or organic pigments, flame-retardant substances and additives.

12. A method of coating or sealing, comprising the steps of mixing the components of the polyurea composition as claimed in claim 1, applying the mixed polyurea composition to at least one substrate, and curing the composition.

13. An article obtained from the method as claimed in claim 12.

14. The polyurea composition as claimed in claim 1, wherein the weight ratio B1/B2 is in the range of 10-25.

* * * * *